United States Patent [19]

Pucher

[11] 4,244,162
[45] Jan. 13, 1981

[54] ROW UNIT FRAME

[75] Inventor: Richard A. Pucher, Leola, Pa.

[73] Assignee: Sperry Corporation, New Holland, Pa.

[21] Appl. No.: 64,269

[22] Filed: Aug. 6, 1979

[51] Int. Cl.³ .......................................... A01D 45/02
[52] U.S. Cl. ...................................... 56/14.2; 56/98
[58] Field of Search .......... 56/14.2, 14.1, 98, 103–106, 56/111, 112, 119, 11.2

[56] References Cited

U.S. PATENT DOCUMENTS

| 3,589,110 | 6/1971 | Schreiner et al. | 56/11.7 |
| 3,609,948 | 10/1971 | Jones et al. | 56/14.2 |
| 3,858,384 | 1/1975 | Maiste et al. | 56/14.2 |
| 4,115,983 | 9/1978 | Barnes et al. | 56/98 |

OTHER PUBLICATIONS

Sperry New Holland, "Operator's Manual", on the Corn Head 962, 4/1978.

Primary Examiner—Jay N. Eskovitz
Attorney, Agent, or Firm—Larry W. Miller; Frank A. Seemar; James R. Bell

[57] ABSTRACT

A row unit for a corn harvesting header is disclosed wherein the frame of the row unit includes a box beam structure at the rear of the unit for housing the gearing necessary for driving the gathering chains and stalk rolls. This unitary row unit frame structure is mounted to the frame of the header by two pairs of Z-shaped clamp members to give a solid, stable, low cost and light weight row unit structure.

14 Claims, 5 Drawing Figures

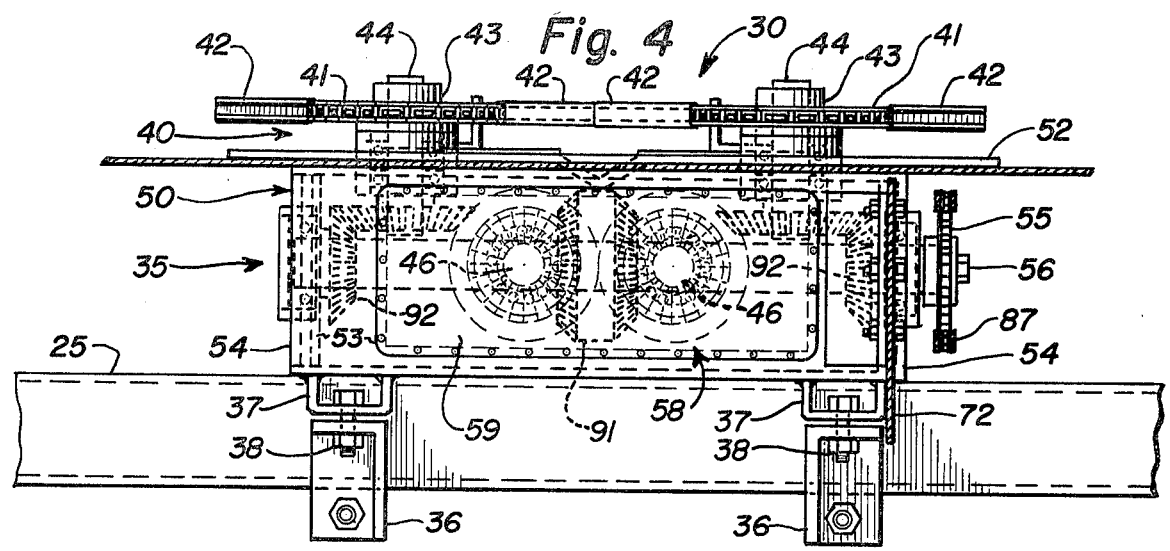
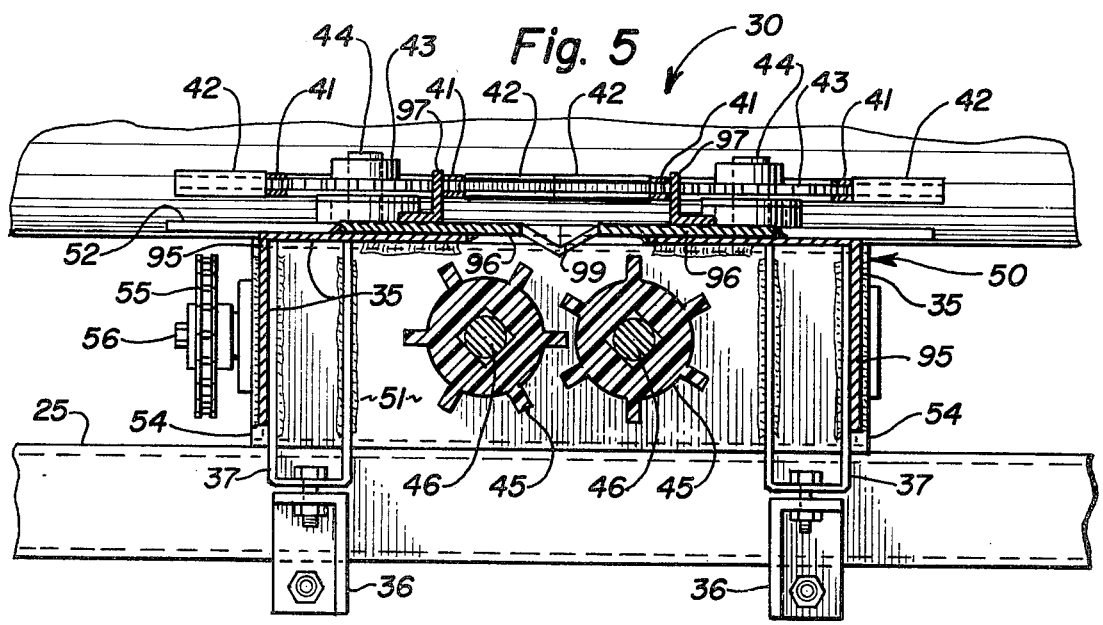

ROW UNIT FRAME

BACKGROUND OF THE INVENTION

The present invention relates generally to row crop harvesting machinery and, more particularly, to an improved row unit frame structure.

Corn headers generally include individual row units normally designed for harvesting a single row of crop material. To accommodate various spacings between rows of crops, these row units are usually adjustably attached to a horizontally disposed frame member. The modern trend in corn headers appears to be one of placing the row units at a low profile to the ground and providing for increasingly larger capacity.

Row units are commonly constructed such that the frame is attachable to a gearbox corresponding to each individual row unit. The gearbox in turn is connected to the horizontally disposed frame member. Reference to such a construction can be had in U.S. Pat. No. 3,589,110.

However, this construction leads to several disadvantages. The row unit frame can become loosened from its mounting on the gearbox which leads to stability problems. The gearbox itself is usually a heavy expensively formed member which, since each corn header includes a plurality of row units, adds, not only to the weight, but also to the cost of the header. Additionally, the extra hardware and connecting means also increases both the weight and the cost of producing corn headers.

Some drive systems have attempted to do away with as much of the gearbox as possible and do not provide lubrication for some of the gears which drive the stalk rolls and/or the gathering chains; however, excessive wear and operating noise lead to the conclusion that such drive systems are less desirable. Moreover, such arrangements generally increase the distance from the end of the gathering chain to the consolidating auger which, in turn, increases the possibility of crop material clogging or plugging the row units with crop becoming lodged in this "dead" area.

SUMMARY OF THE INVENTION

It is an object of this invention to overcome the aforementioned disadvantages of prior art row unit construction.

It is another object of this invention to provide a row unit design which can be manufactured, constructed and utilized simply and inexpensively.

It is still another object of this invention to provide a lower cost row unit having less weight to facilitate the expansion of corn headers to increasingly larger sizes.

It is a further object of this invention to provide a stable, more positive means for securing the row unit to the frame of a corn header.

It is a still further object of this invention to provide a stronger, more stable row unit frame structure.

It is a still further object of this invention to provide a sealed housing within the frame of the row unit of a corn harvesting header wherein gearing can be placed for driving the gathering means and wherein lubrication can be retained.

It is an even further object of this invention to provide a frame for a row unit of a corn header which is durable of construction, inexpensive of manufacture, carefree of maintenance, facile in assemblage and effective in operation.

These and other objects are accomplished according to the instant invention by providing a row unit for a corn harvesting header wherein the frame of the row unit includes a box beam structure at the rear of the unit for housing the gearing necessary for driving the gathering chains and stalk rolls. This unitary row unit frame structure is mounted to the frame of the header by two pairs of Z-shaped clamp members to give a solid, stable, low cost and light weight row unit structure.

BRIEF DESCRIPTION OF THE DRAWINGS

The advantages of this invention will become apparent upon consideration of the following detailed disclosure of the invention, especially when taken in conjunction with the accompanying drawings wherein:

FIG. 5 is an enlarged cross sectional view of the row unit corresponding to line 5—5 of FIG. 3.

DETAILED DESCRIPTION OF THE DRAWINGS

Figure 1:
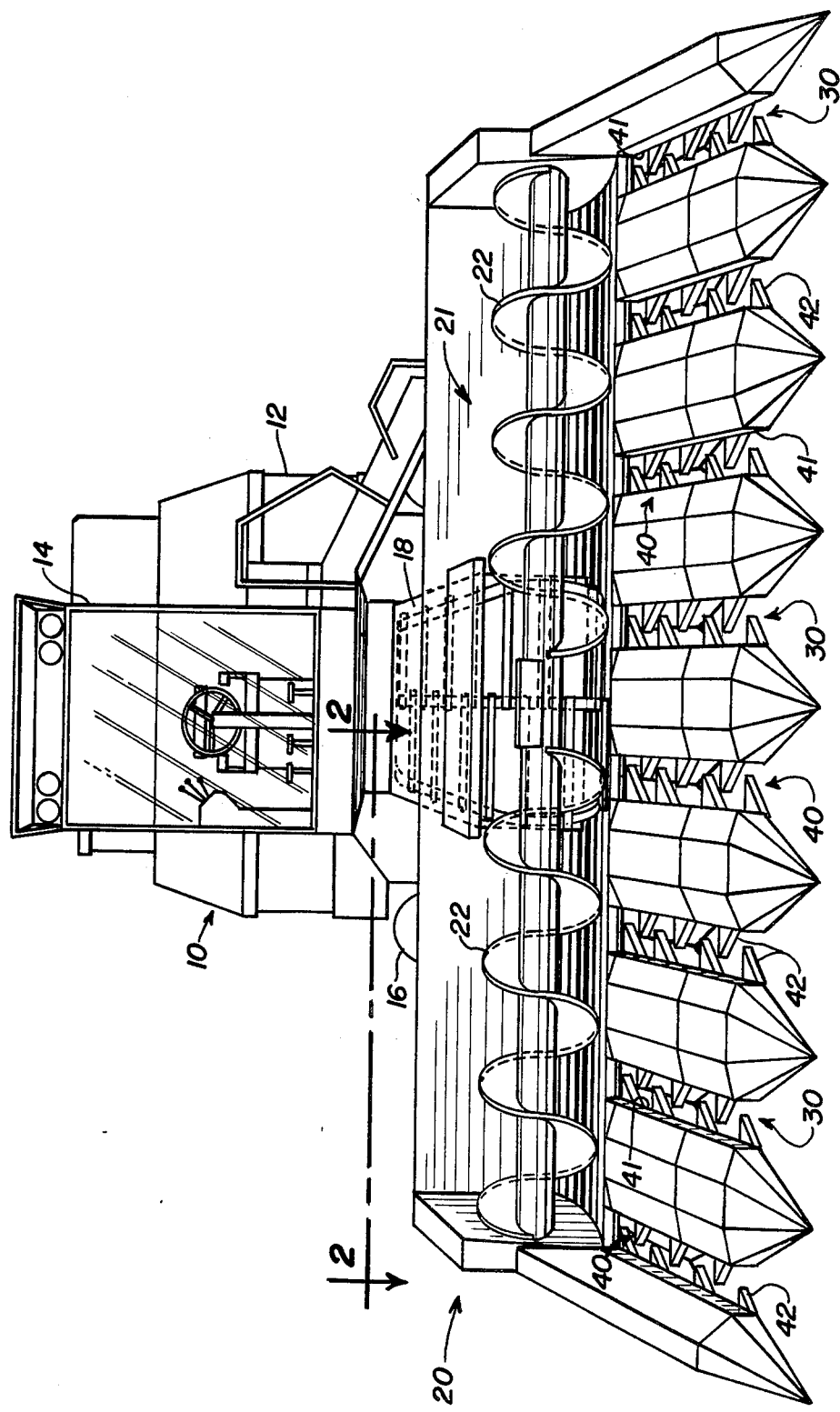
FIG. 1 is a front elevational view of a combine unit having a corn harvesting header attached thereto.

Referring now to the drawings and particularly to FIG. 1, a front elevational view of a combine having a corn harvesting header attached thereto can be seen. Left and right references are used as a matter of convenience and are determined by standing at the rear of the machine facing the forward end, the direction of travel. The corn harvesting header 20 is attached to the front of a combine base unit 10 for harvesting row crop material such as corn. Generally, the combine base unit 10 is comprised of a crop treating unit 12, a cab 14, elevated above the header 20 for full view of the crop harvesting process occurring in the header, a wheeled frame 16 and a feeder house structure 18 for conveying crop harvested by the header 20 rearwardly to the crop treating unit 12.

As can clearly be seen in FIG. 1, the corn harvesting header 20 is generally comprised of individual row units 30, spaced to correspond to the spacing of the row crop material to be harvested, and a consolidating means 21, seen in the form of a auger 22, for transporting the harvesting crop material to the center of the header 20 for engagement with the feeder house 18.

Figure 2:
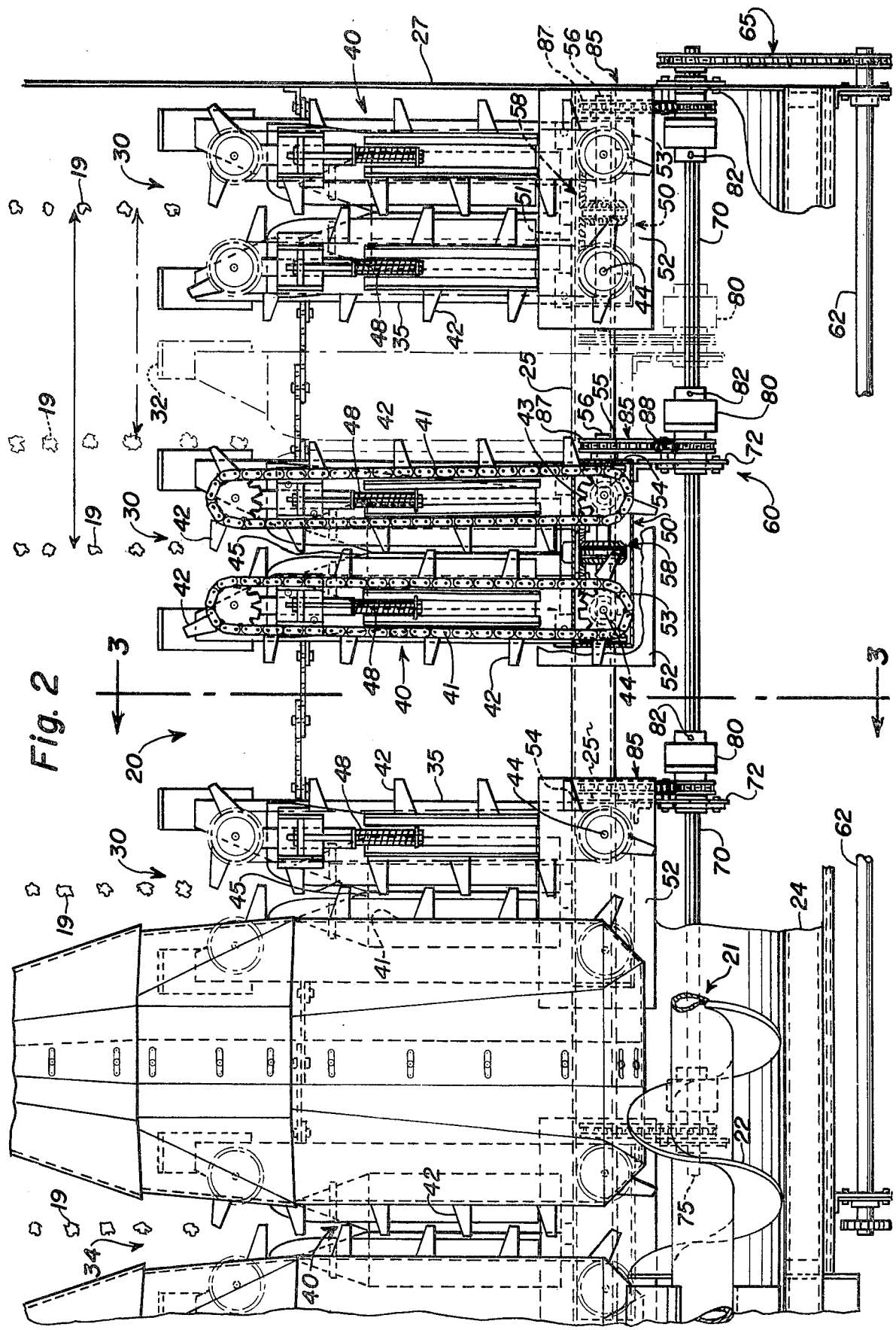
FIG. 2 is a partial top view of the corn harvesting header seen in FIG. 1, with various portions broken away for clarity, corresponding to line 2—2.

Referring now to FIG. 2, a more detailed view of the individual row units 30 and the drive system 60 can be seen. Each individual row unit includes a gathering means 40 for harvesting the crop material 19 and delivering it rearwardly toward the consolidating means 21. The gathering means 40 is shown in FIG. 2 as including a dual set of gathering chains 41 which are counter-rotatable and operable to convey the crop material rearwardly. These gathering chains 41 are equipped with lugs 42 to facilitate this process. The lugs 42 are shown in FIG. 2 as having a staggered relationship, with the lug of one gathering chain being between adjacent lugs of the opposing gathering chain. Since it has been found that timing the lugs in opposing alignment works as well as the displayed arrangement, one skilled in the art should realize that this arrangement is not a limitation to the instant invention.

Figure 3:
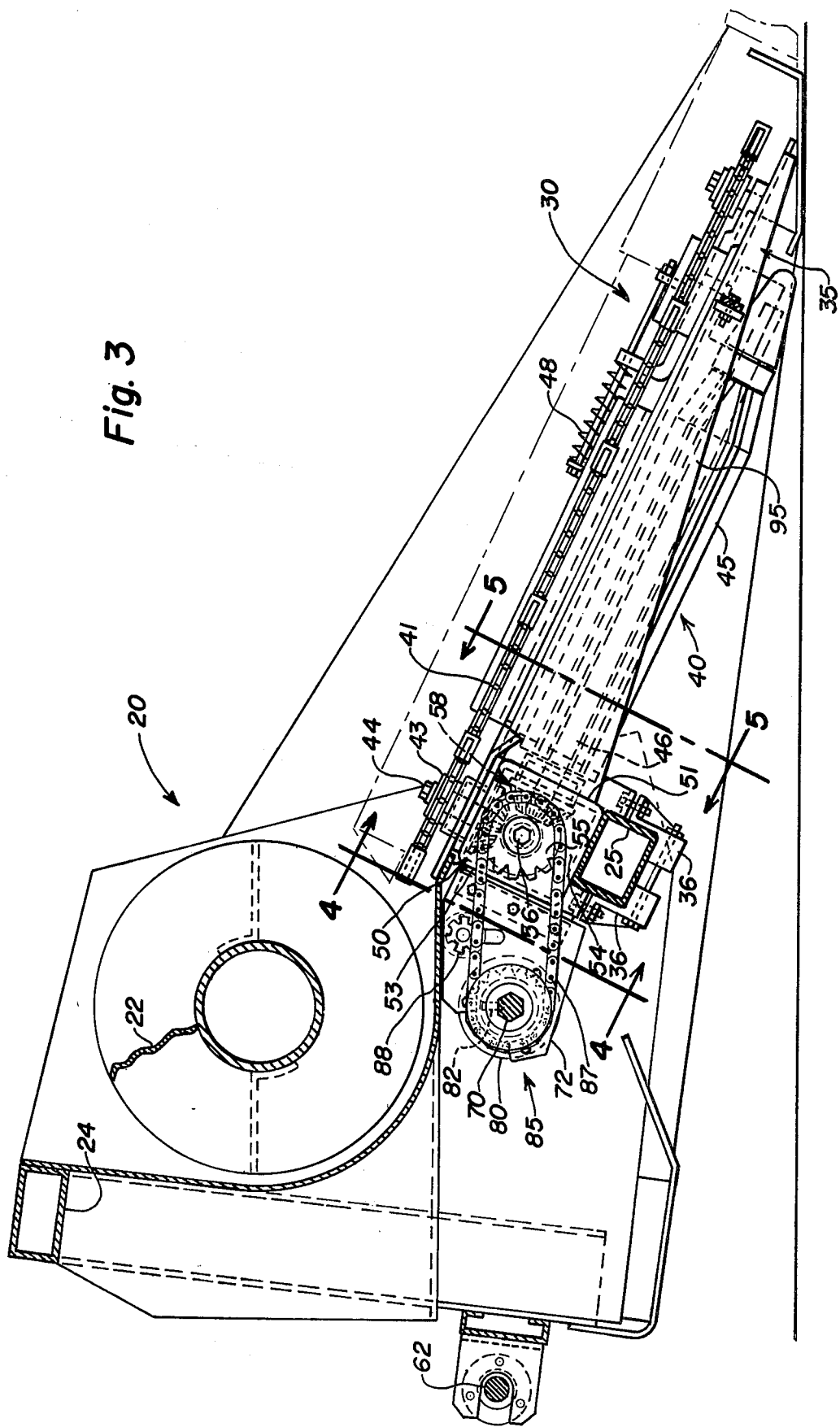
FIG. 3 is an enlarged cross sectional view of the corn header corresponding to line 3—3 of FIG. 2; is an enlarged cross sectional view of the corn header, corresponding to line 4—4 of FIG. 3, showing a rear view of an individual row unit.

As seen in FIGS. 2 and 3, the gathering means 40 also includes a pair of counter-rotating stalk rolls 45 positioned beneath the gathering chains 41. The stalk rolls 45 are operable for pulling the crop material 19 downwardly between the gathering chains 41. Also seen positioned on top of the row unit 30 is a tensioning device 48 for maintaining tension within the gathering chains 41.

A box beam 50 for housing the various gears 58, for driving the gathering means 40, is an integral, unitary part of the frame 35 of each row unit 30. A shaft 56, with a power receiving sprocket 55 affixed thereto, protrudes from the side 54 of the box beam 50. Rotation of the power receiving sprocket 55 and the affixed shaft 56 provides a source of rotation to the various gears 58 which in turn rotate the gathering chains 41 and the stalk rolls 45. The stalk rolls 45 are connected to shaft 46 extending from the front 51 of the box beam 50, while the gathering chains 41 are rotated by a shaft 44 and associated drive sprocket 43 projecting upwardly from the top 52 of the housing 50.

Both the stalk roll shaft 46 and the drive shaft 44 to the gathering chains 41 are driven by gearing 58 attached to the single power receiving shaft 56. The use of one power receiving shaft 56 to drive the entire gathering means 40 enables the distance from the end of the gathering chains 41 to the consolidating auger 22 to be kept at a minimum which reduces the chances of the row unit 30 becoming clogged or plugged.

The header frame 24 includes a horizontally disposed transverse beam 25 seen in both FIGS. 2 and 3. This beam 25 provides support for each individual row unit 30, which are attached to the beam 25 by two pairs of Z-shaped clamps 36. Each pair of clamps 36 is bolted together and to the frame 25 of the row unit 30, effectively encircling the beam 25 and, thereby, providing a positive clamping method and a stable header structure.

The power input shaft 70 is located substantially parallel to the beam 25, rearward of the individual row units 30 and externally of the box beam 50 portion of the row unit frames 35, which serves as a gear housing. The power input shaft 70 is rotatably supported by a mounting bracket 72 affixed to the rear 53 of each row unit frame 35. With smaller headers, one single power input shaft 70 can provide rotational power to all of the row units. However, with headers 20 of the size seen in FIG. 1, it has been found that two power input shafts 70, each providing rotational power to half of the row units 30, is most efficient. As can be seen in FIG. 2, the power input shaft 70 provides power to the group of four row units closest to the right side 27 of the header 20. The end 75 of the power input shaft 70 can be seen rearward of the fourth row unit 34 from the right side 27.

A slip clutch 80 is provided for each row unit 30 and is located on the power input shaft 70 rearward of the power receiving sprocket 55. The slip clutch 80 provides protection for the entire drive system 60. If the gathering means 40 of any one of row units 30 becomes clogged with crop material, and, therefore, requires more power to operate than the drive components were designed to handle, the slip clutch 80 becomes disengaged and prevents further transfer of power to that particular gathering means; however, the power input shaft 70 continues to rotate and provides rotational power to all the row units 30 whose slip clutches 80 remain engaged. Each slip clutch 80 is attached to the power input shaft 70 by a set screw 82 to prevent lateral movement and can be positioned to provide power to either side of the housing 50.

A power transfer means 85, including an endless chain 87, transfers rotational power from each slip clutch 80 to the respective power receiving sprocket 55, which in turn rotates the various gears 58 to operate the gathering means 40. The power transfer chain 87 is connected to the slip clutch 80 in such a manner that when the slip clutch 80 becomes disengaged, power can no longer be transferred to the power receiving sprocket 55 until the slip clutch 80 is re-engaged. As can be best seen in FIG. 3, the power transfer means 85 also includes a tensioning sprocket 88 to maintain proper tension in the chain 87. The term "endless chain" is used throughout this application to indicate the physical appearance of the chain member rather than the true structural configuration.

The combine base unit 10 serves as the prime mover for the header drive system 60. The header drive shaft 62 receives rotational power from the base unit 10 and transfers it to the power input shaft 70 at the right side 27 of the header 20 by a chain and sprocket means 65. With corn headers 20 of the size seen in FIG. 1, having two power input shafts 70, a header drive shaft 62 and chain and sprocket means 65 would be necessary for each half of the header 20. It should further be realized by one skilled in the art that the left half of the header is substantially the mirror image of the right half.

Each row unit 30 is adjustable with respect to spacing between adjacent row units. The row unit 32 shown in phantom depicts how closely the row units 30 may be spaced from each other. Since the slip clutch 80 is placed on the power input shaft 70 rearward of the row unit 30, only the frames 35 of the row units themselves limit the spacing therebetween. To adjust the row unit spacing, it would only be necessary to loosen the Z-shaped clamps 36 mounting the row unit to the horizontal beam 25 and loosen the set screw 82 fastening the slip clutch 80 to the power input shaft 70, then the row unit 30 can be moved along the horizontal beam 25 to the desired location and the slip clutch 80 slid along the power input shaft 70 to a position in proper alignment with the row unit.

In FIG. 4, the rear view of an individual row unit can be seen. The row unit frame 35 is secured to the horizontal beam 25 by Z-shaped clamps 36 secured to tabs 37 by bolts 38. Centrally located bevel gear 91, which drives the stalk roll shafts 46, and laterally located bevel gears 92, which drive the gathering chain drive shafts 44, are connected to the single power receiving shaft 56 to compactly and efficiently drive the crop gathering means 40. The rear 53 of the box beam portion 50 of the row unit frame 35 includes an access plate 59 to facilitate service and maintenance to the various gears 58.

Referring now to FIG. 5, a more detailed view of the row unit frame structure can be seen. The box beam 50 is an integral, unitary part of the row unit frame 35, which increases the strength of each individuals row unit 30. Tabs 37 are affixed to the front 51 of the box beam 50 to provide a means for securing the row unit 30 to the horizontal beam 25 in cooperation with the Z-shaped clamps 36.

As can be seen in both FIGS. 3 and 5, the row unit frame 35 further includes legs 95 projecting forwardly from the box beam 50. These legs 95, having an L-shaped cross sectional configuration, in turn support spaced apart deck plates 96 which cooperate with the stalk rolls 45 and gathering chains 41 to harvest ears of corn. Chain guides 97 are affixed to the deck plates 96 to maintain the rotating gathering chains 41 in their proper positional relationship, while a V-shaped cutoff 99 is positioned between the deck plates 96 adjacent the box beam 50 provides a means for cutting the crop material.

As can be readily realized by one skilled in the art, this row unit frame is stronger and more stable than those found in the prior art and, consequently, can be constructed to weigh less. Therefore, expansion to larger sized headers are facilitated and the individual row unit costs can be reduced.

To operate the corn harvesting header 20, after attaching it to the combine base unit 10, rotational power is supplied to the header drive shaft 62 and the header 20 is moved forwardly through a field of row crop material such as corn. The row units 30 are spaced to correspond to the spacing of the rows of corn and each row unit 30 is positioned to engage one row.

The header drive shaft 62 rotates the power input shaft 70 through use of the chain and sprocket means 65 at the sides of the header 20. The power input shaft 70 in turn rotates the slip clutches 80 which are normally engaged to rotate the endless chain 87 of the power transfer means 85. The corresponding rotation of the power receiving sprocket 55 and its associated shaft 56 rotates the various gears 58 positioned within the box beam 50 portion of the frame 35 of the row units 30.

The gathering chains 41 then rotate in opposite directions such that corn stalks 19 are engaged and pulled rearwardly between them and the spaced apart deck plates 96. Simultaneously, the stalk rolls 45 are counter-rotated such that the corn stalks being transported rearwardly between the gathering chains 41 are also pulled downwardly between the stalk rolls 45. The resultant action is that the ear of corn becomes separated from the corn stalk and is conveyed rearwardly to the consolidating auger 22, which delivers the ears of corn to the feeder house 18 for subsequent harvesting treatment.

It will be understood that various changes in the details, materials, steps and arrangements of parts which have been described and illustrated in order to explain the nature of the invention, will occur to and may be made by those skilled in the art upon a reading of the disclosure within the principles and scope of the invention.

Having thus described the invention, what is claimed is:

1. A corn harvesting header attachable to a mobile crop treating unit comprising:
   a main frame having a transverse substantially horizontal beam;
   a plurality of forwardly extending spaced apart row units supported by said transverse beam, each respective said row unit having gathering means for harvesting the crop material and delivering the harvested crop material rearwardly, each said respective row unit being operable to harvest a row of corn, each respective said row unit further having a single unitary subframe structure including an elongated box beam portion positioned generally parallel to said transverse beam of said main frame and two spaced apart nondetachable L-shaped leg members extending forwardly from said box beam portion, each said respective row unit being selectively adjustable along said horizontal beam, whereby the relative spacing between adjacent row units may be selectively varied;
   a transverse power input shaft rotatably supported by said main frame for delivering rotational power to said gathering means from a prime mover;
   a clutch means corresponding to each respective said row unit for terminating the transmission of power from said power input shaft to the respective said gathering means upon an overload therein, each respective said clutch means being operable to terminate power to only the corresponding gathering means without effecting the transmission of power to other row units; and
   a power transfer means for transferring power between said power input shaft and each respective said gathering means.

2. The corn header of claim 1 wherein each respective said row unit includes a gear system for receiving rotational power transferred by said power transfer means and driving said gathering means, said gear system being positioned within said box beam portion of said row unit subframe.

3. The corn header of claim 2 wherein said box beam portion of said row unit subframe is sealed to retain lubrication for said gear system.

4. The corn header of claim 3 wherein said gathering means includes two adjacent longitudinally extending endless gathering chains, operable for conveying crop material rearwardly, and a pair of rotatable stalk rolls forwardly extending from said box beam portion of said row unit subframe below said gathering chains, said L-shaped leg members of said row unit subframe supporting spaced apart deck plates positioned between said gathering chains and said stalk rolls, said stalk rolls being operable to pull said crop material downwardly between both said deck plates and said gathering chains such that ears of corn become stripped from the corn stalk and conveyed rearwardly for further treatment.

5. The corn header of claim 4 wherein said row unit subframe is connected to said transverse beam by two pairs of Z-shaped clamps, each said Z-shaped clamp having a flat surface positioned adjacent said transverse beam, each said pair of Z-shaped clamps including connecting means for securing said clamps to each other and to said row unit subframe.

6. The corn header of claim 5 wherein said box beam portion of each said row unit subframe includes tabs affixed thereto for cooperation with said connecting means to secure each said row unit to said transverse beam.

7. The corn header of claim 6 wherein said deck plates include a V-shaped cutoff member therebetween adjacent said box beam portion of said row unit subframe and a plurality of chain guides thereon for cooperation with said gathering chains to maintain the positional relationship therebetween.

8. The corn header of claim 7 wherein said box beam portion of said row unit subframe includes a rear side having a mounting bracket affixed thereto for supporting said transverse power input shaft and an access plate therein to allow access to said gear system for maintenance thereof.

9. A corn harvesting header attachable to a mobile crop treating unit comprising:
   a main frame having a transverse generally horizontal beam;
   a plurality of forwardly extending spaced apart row units supported by said transverse beam, each respective said row unit having gathering means for harvesting crop material and delivering the harvested crop material rearwardly;

each respective said row unit further having a unitary subframe structure including an elongated box beam portion positioned adjacent to said transverse beam and substantially parallel thereto and two spaced apart support legs projecting forwardly from said box beam portion, said support legs providing support for said gathering means;

two pairs of Z-shaped clamps detachably connecting each respective said row unit subframe to said transverse beam, each respective said clamp having a generally planar body portion terminating in first and second legs projecting from said body portion in opposing directions, each said pair of Z-shaped clamps being positioned such that said corresponding body portions and second legs effectively embrace said transverse beam;

connecting means interconnecting said corresponding second legs of each said pair of Z-shaped clamps and connecting each respective said first leg to said corresponding row unit subframe for securing said clamps to each other and to said row unit subframe; and drive means for driving said gathering means.

10. The corn header of claim 9 wherein said box beam portion of each said row unit subframe includes tabs affixed thereto for cooperation with said connecting means to secure said subframe to said corresponding first legs of said clamps.

11. The corn header of claim 10 wherein each respective said box beam portion is positioned above said transverse beam, said second legs of the corresponding said clamps being positioned below said transverse beam.

12. The corn header of claim 9 wherein said drive means includes a gear system for transferring rotational power to said gathering means, said gear system being operatively positioned within said box beam portion of said row unit subframe.

13. The corn header of claim 12 wherein said box beam portion of said row unit subframe is sealed to retain lubrication for said gear system.

14. The corn header of claim 13 wherein said box beam portion of said row unit subframe includes a rear side opposite from said support legs of said subframe and having an access opening therein to provide access to said gear system, said box beam portion further including an access plate for covering and sealing said access opening.

* * * * *